United States Patent

Moharram

Patent Number: 6,079,036
Date of Patent: *Jun. 20, 2000

[54] CALL MESSAGE WITH TRAVELING LOG FOR TESTING INTELLIGENT TELECOMMUNICATIONS NETWORK

[75] Inventor: Omayma El-Sayed Moharram, Carleton Place, Canada

[73] Assignee: Nortel Networks Corporation, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/545,183

[22] Filed: Oct. 19, 1995

Related U.S. Application Data

[63] Continuation-in-part of application No. 08/343,854, Nov. 17, 1994, abandoned.

[51] Int. Cl.[7] .......................... G01R 31/28; H03M 13/00; G06F 7/02
[52] U.S. Cl. ........................... 714/712; 714/749; 714/751; 714/821
[58] Field of Search .................................... 714/712, 749, 714/750, 751, 752, 821; 370/244, 245, 248, 249, 252

[56] References Cited

U.S. PATENT DOCUMENTS

| | | | |
|---|---|---|---|
| 4,745,593 | 5/1988 | Stewart | 370/15 |
| 4,797,875 | 1/1989 | Pospischil et al. | 370/92 |
| 4,910,760 | 3/1990 | Reformato | 379/13 |
| 5,218,676 | 6/1993 | Ben-Ayed et al. | 395/200 |
| 5,359,646 | 10/1994 | Johnson et al. | 379/27 |
| 5,390,298 | 2/1995 | Kuszmaul et al. | 395/200 |

FOREIGN PATENT DOCUMENTS

| | | | |
|---|---|---|---|
| 0 411 798 A2 | 2/1991 | European Pat. Off. | H04M 3/24 |
| 1 218 902 | 1/1971 | United Kingdom | H04M 7/14 |
| 2 176 972 | 1/1987 | United Kingdom | H04L 11/20 |

OTHER PUBLICATIONS

NOMS 92–IEEE 1992–Network Operations and Management Symposium, vol. 3, Apr. 6–9, 1992 Memphis (US), pp. 709–720, Myranda A. Johnson et al, "New Service Testing Functions for Advanced Intelligent Networks".

*Primary Examiner*—Hoa T. Nguyen
*Attorney, Agent, or Firm*—John A. Granchelli; Dallas F. Smith; Dennis J. Williamson

[57] ABSTRACT

In an Intelligent Network (IN) a method for acquiring data is provided. The method comprises a test call initiated from the SSP to a desired destination within the network. The test call with the log portion appended to TCAP (and ISUP) messages travel through the network and collects data in the log portion from each node on the test call path. The test call with the traveling log (TLog) helps the maintenance personnel isolate troubles and faults in the network without having to monitor each node (or office) on the route of a troubled message path.

42 Claims, 9 Drawing Sheets

| | 8 | 7 | 6 | 5 | 4 | 3 | 2 | 1 |
|---|---|---|---|---|---|---|---|---|
| 1 OCTET | | | | TCP MSGID | | | | 80 |
| 1 OCTET | RESERVED | | | DIRIND | TCP ROUTE SELECTION | | | 82 |
| 3 OCTETS | DESTINATION POINT CODE (DPC) | | | | | | | 86 |
| 3 OCTETS | ORIGINATION POINT CODE (OPC) | | | | | | | 88 |
| 3 OCTETS | IN NODE PC (=OPC) | | | | | | | 90 |
| 1 OCTET | TCP SELECTED ROUTE | | | TCP ROUTE ENG COUNTER | | | TCP ROUTE USABLE COUNTER | |

FIG. 7

| | 8 | 7 | 6 | 5 | 4 | 3 | 2 | 1 |
|---|---|---|---|---|---|---|---|---|
| 3 OCTETS | IN NODE PC | | | | | | | 90 |
| 1 OCTET | TCP SELECTED ROUTE | | | TCP ROUTE ENG COUNTER | | | TCP ROUTE USABLE COUNTER | |

FIG. 8

| | 8 | 7 | 6 | 5 | 4 | 3 | 2 | 1 |
|---|---|---|---|---|---|---|---|---|
| 3 OCTETS | IN NODE PC (=DPC) 90 ||||||||
| 1 OCTET | TCP SELECTED ROUTE ||| TCP ROUTE ENG COUNTER ||| TCP ROUTE USABLE COUNTER |||
| 3 OCTETS | FIRST LEG END PC  98 ||||||||
| 1 OCTET | TCP FAULT CODE ||||||||

| | 8 | 7 | 6 | 5 | 4 | 3 | 2 | 1 |
|---|---|---|---|---|---|---|---|---|
| 3 OCTETS | IN NODE PC ||||||||
| 1 OCTET | TCP SELECTED ROUTE ||| TCP TLOG COUNTER  101 |||||
| 3 OCTETS | TCP FIRST LEG END PC ||||||||
| 1 OCTET | TCP FAULT CODE ||||||||

CALL MESSAGE WITH TRAVELING LOG FOR TESTING INTELLIGENT TELECOMMUNICATIONS NETWORK

This application is a continuation-in-part of application Ser. No. 08/343,854 filed on Nov. 17, 1994, now abandoned.

BACKGROUND OF THE INVENTION

This invention relates, generally, to telecommunication intelligent and advance intelligent networks and, in particular, to a methodology for collecting data in such networks based on propagation of a test call message incorporating a travelling log through the network.

It is noted that general references made herein to "intelligent network" or "IN" is intended to specifically cover intelligent networks (INs) and advance intelligent networks (AINs), as it will be apparent to those skilled in the art that the present invention is equally applicable to both IN and AIN testing.

An IN based service offering requires cooperation between many different network elements (NEs) and network systems (NSs), which typically include service switching points (SSPs), Intelligent Peripheral (IPs), Mediation Points (MPs), Signaling Transfer Points (STPs), Adjuncts, and service control points (SCPs) that communicate using a common channel signaling number 7 (CCS7) network protocol. The main objective of intelligent network testing is to trouble-shoot the implementation of the SSP, IP, Adjunct, STP, MP, and SCP relevant service specifications, to ensure that they can operate harmoniously. Trouble-shooting in an operational environment where multiple network elements (e.g., SSPs, IPs, Adjuncts, MPs, SCPs) and a signaling system number 7 (SS7) network, which includes signaling transfer points (STPs) and links, are required to set up connections between elements, presently requires either manual operations or external operations systems (OSs) to analyze and correlate the event/alert messages at the various elements in the network. Manual operations are not practical. External OSs may not be available.

When customers report trouble, or the network surveillance processes and OSs detect problems in the network, a tester or maintenance personnel uses the local SSP maintenance capabilities to both verify and isolate these problems, and then check that they have been repaired. The SSP maintenance capabilities may include a capability to check the IN call routing and translation, a capability to access and display trigger information and status, as well as the notification (event/alert) messages and measurements. These capabilities can be used to determine the source of the problem, be it in the SSP or outside the SSP which may be in the signaling network, a remote SCP, mediation points (MPs), an intelligent peripheral (IP), adjunct, or in any other element in the network.

In North America, Bell Communication Research (Bellcore) AIN SSP generic specifications [1] TR-NWT-001284, Advanced Intelligent Network (AIN) 0.1 Switching Systems Generic Requirements, Bellcore Technical Reference, Issue 1, August 1992 and [2] GR-1298-CORE, Advanced Intelligent Network (AIN) 0.2 Switching Systems Generic Requirements, Bellcore, Issue 2, December 1994, both of which hereby are incorporated herein by reference, provided tools for network testing which include a message format with an AIN maintenance parameter (AMP) and a call history log (C-Log). A test call message having its AMP set is launched from a SSP by a tester. As the message propagates through the network, any SSP or SCP along the test call message route recognizes the AMP parameter, and activates the collection of data and messages related to this call. This information is stored in the C-Log which is local to the particular network element. The tester is required to log onto each element (SSPs and SCPs) along this path and retrieve the specific C-Log relevant to this test call. This process is time consuming and complex for network maintenance and operations.

Further, in a multi-vendor Network Elements (NEs) and Network Systems (NSs) operations environment, it is difficult to determine the signaling network configuration and routing of CCS7 messages for specific subsystems. Maintenance personnel often have to rely on information given by the customer to determine the network configuration, before they start trouble-shooting the network. Capturing specific messages by setting a trap on the SSP for IN events and messages in a live environment is difficult because multiple messages from other calls and queries are typically coming in. This shortcoming could create the laborious task of checking the Datafill at various sites in the routing message for various multi-vendor network elements (NEs) and network systems (NSs).

Therefore, there is an apparent need for better methodologies to effect testing of intelligent networks.

SUMMARY OF THE INVENTION

An object of the present invention is to provide a new and improved method for collecting data in an intelligent network. Furthermore, a new and improved test message is defined.

In accordance with an aspect of the present invention, there is provided a method of collecting data in a telecommunications network that includes an intelligent network, the intelligent network having at least a service switching point and a service control point, the method comprising the steps of: sending, by the service switching point, a test call message to a destination node, the test call message including an indication that it is a test call message, an indication for identifying the data which is to be collected and a log for receiving collected data; applying, by a node that the test call message traverses en route to the destination node and responsive to the indication for identifying the data which is to be collected, an entry to the log; and sending a return message, which includes the log, to the originating node from a terminus node.

According to the invention, a service switching point (SSP) IN test call capability is provided to help isolate IN call processing failures by correlating the events and the messages generated by the SSPs, SSP-SS7 signaling network, SSP-SCP/adjunct, SSP-IP, and SSP-MP, interfaces, and recording them in a log report. The capability may be local to the SSP and determines the nodes traversed in the routing of the test call.

Conveniently, the return message includes the indication for identifying the data which is to be collected, and the method further comprises applying, by a node that the return message traverses en route to the originating node and responsive to the indication for identifying the data which is to be collected, an entry to the log. An advantage of the present invention is that it enables a tester to sectionalize IN call processing and signaling failures to the responsible element in the network, (i.e., SCP/Adjunct, local IP, remote IP, MP, remote SSP), which is especially vital to IN services because multiple networks systems in addition to the multiple network elements within a network system may be involved in setting up and processing the call for that service. It is particularly useful for isolating intermittent IN call processing failures that are difficult and time-consuming for the tester to reproduce.

BRIEF DESCRIPTION OF THE DRAWINGS

The present invention will be further understood from the following description together with reference to the accompanying drawings in which.

DETAILED DESCRIPTION

Figure 1:
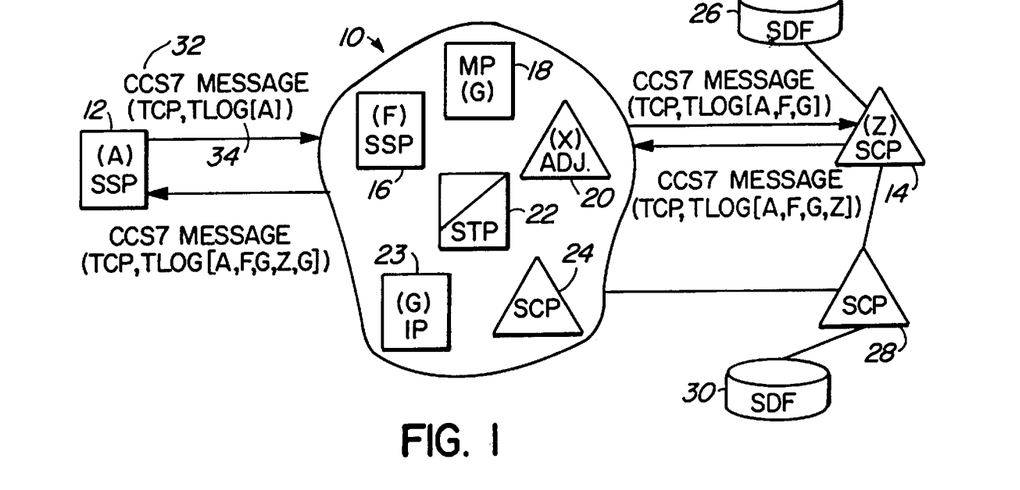
FIG. 1 illustrates intelligent network data collection in accordance with an embodiment of the invention.

Referring to FIG. 1, depicted is a representation of an intelligent network (IN) 10 which together with the following description will illustrate the methodology for collecting data in a telecommunications network in accordance with the present invention. The intelligent network 10 provides connection between a service switching point (SSP) 12, labeled as Node A, and a service control point (SCP) 14, labeled as Node Z. The intelligent network 10 may also include nodes B through X, but for simplicity only a few nodes are illustrated and labeled. Connections between nodes within the intelligent network 10 are not shown in FIG. 1, indicative of the fact that SSP 12 (Node A) has no knowledge of such connections. Hence, the intelligent network 10 is represented by an SSP 16, labeled Node F, a Mediation Point (MP) 18, labeled Node G, an adjunct 20, labeled Node X, signaling transfer point (STP) 22, an intelligent peripheral (IP) 23 and a further SCP 24. The SCP 14 is logically connected to a service data function (SDF) 26 and is connected to another SCP 28 having its own SDF 30.

In operation, the SSP 12, requiring connection to the SCP 14, for example in order to access a new network service, desires testing of the connection through the intelligent network 10 to SCP 14. In accordance with an embodiment of the present, data collection is accomplished by launching a test call from the SSP 12 to the SCP 14 through the intelligent network 10. The test call is in the form of a message 32 sent from the SSP 12 and includes routing information specifying SCP 14 as the destination. The message 32, as indicated in FIG. 1, may conform to conventional generic CCS7 message formats and, in accordance with the present invention, is provisioned with a unique test call parameter (TCP) field which identifies it as a test message. Details of the format of the test call message 32 are given below. The SSP 12 indicates in a log report 34, according to the invention, appended to the message 32 its identity by including a Node A "stamp" which includes relevant data associated with the SSP 12 (Node A). The test call capability, at a given node, for example SSP 16 (Node F) determines from the message whether the routing message is a test call message, by recognizing the test call parameter (TCP) in the message, and then checks if the destination node specified in the routing information of the message is its own node:

If it matches, the MP 16 (node G) attaches a stamp in the log report 34 section of the message, indicating that it reached the specified destination node which is the end of the first leg for the test call message. The node then replies to the originating node, SSP 12, with an appropriate message including the log report of where the message has been. The MP 16 may be characterized as both the destination and terminus network element in this context.

If it doesn't match, the MP 16 (Node G) attaches a stamp in the log report 34 section of the message 32, and forwards the message 32 according to the routing information. The MP 16 is considered an intermediate network element.

If it doesn't match and it cannot be routed further, the MP 16 (node G) attaches a stamp in the log report 34 section of the message 32 along with an "error indication—no route" and replies to the originating node, SSP 12, with an appropriate message information. In this case, the MP 16 is considered the terminus or terminating network element.

Information that may be entered into the log report (e.g., node "stamp") by the network element traversed in propagation of the test call includes routing availability and usability, routing cost, signaling information, IN message type, service subsystem number, service and service provider information, subscriber and subscription data, service logic information, and fault codes relevant to the trouble or faults encountered on the IN test call route.

The test call capability helps a tester isolate trouble or faults in the intelligent network 10 without having to log onto and monitor each node (or office) on the route of a troubled message path. The tester, using a craft terminal (i.e., workstation) which may be locally connected or remotely via the OS connected to the SSP 12, can access this capability. The test call capability provides originating, intermediate and terminating node stamps along the routing of the message.

Intelligent network elements, such as the SSP 12 and SCP 14, communicate via the intelligent network 10 using a signaling system number 7 (SS7) network protocol. The messages carried on the SS7 network protocol are known as Common Channel Signaling number 7 (CCS7) messages.

CCS7 messages and telephone calls are routed in accordance with information imbedded in CCS7 messages. In general, CCS7 messages in relation to the present invention may have three parts:

1. Message Transfer Part (MTP) which contains the routing label including the Origination Point Code (OPC) and Destination Point Code (DPC).
2. Signaling Connection Control Part (SCCP) containing the Global Title information.
3. A data field containing either:
   a. Data for call setup. The data for call set up is defined as ISDN User Part (ISDNUP or ISUP) data, or
   b. Data for database services. This data is defined as Transaction Capability Application Part (TCAP) data.

All data packets (or packages) sent across the network must have the originating and terminating node addresses imbedded in the packet header. In the Signaling System number 7 (SS7) terminology these addresses are called the Originating Point Codes (OPC) and Destination Point Codes (DPC), respectively.

Figure 2:
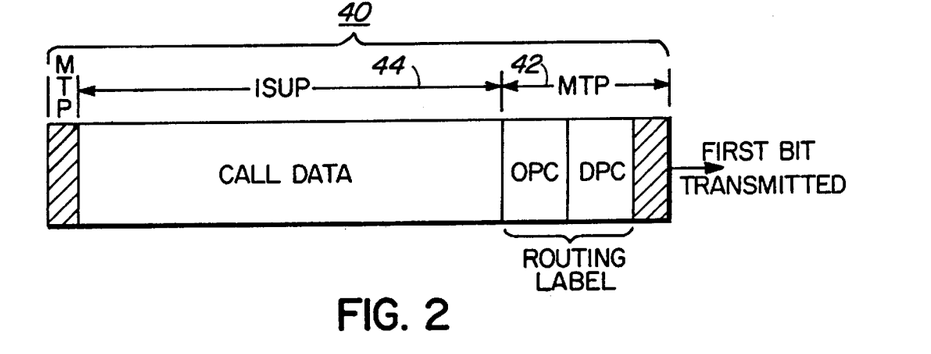
FIG. 2 illustrates a CCS7 ISDNUP/ISUP message for basic call setup.
Figure 3:
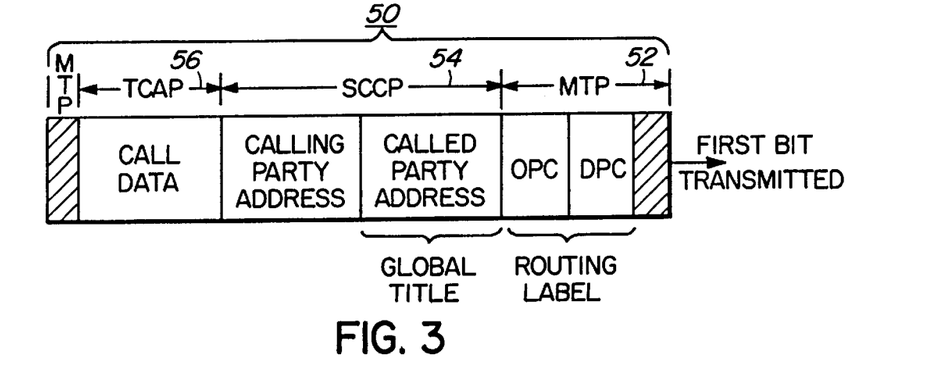
FIG. 3 illustrates a CCS7 IN query message (or package)

Two specific types of CCS7 messages that may be utilized for implementing the IN test call capability are: ISDN user part (ISDNUP or ISUP) messages, and intelligent network (IN) query messages or packages. Referring to FIG. 2, there is illustrated a format of the CCS7 ISUP message for basic call setup. The CCS7 ISUP message 40 includes the MTP 42 and the ISUP 44 which are required for basic call routing. FIG. 3 illustrates the CCS7 IN query message (or package) for intelligent network queries. The CCS7 IN query message 50 includes the MTP 52, the SCCP 54, and the TCAP 56 which are required for routing of queries.

The SSP IN test call may use SS7 network message encoding formats, such as the CCS7 ISUP message 40 or the CCS7 IN Query message 50, incorporated into which are a test call parameter (TCP) and a traveling log (TLog). An originating SSP, for example SSP 12 of FIG. 1, applies the TCP to effect propagation of the test call message and collection of network element stamps. In other words, the TCP is used to mark and trace test calls, and activate generation and collection of the log report entries in the test call message at the various elements traversed within the intelligent network.

Figure 4:
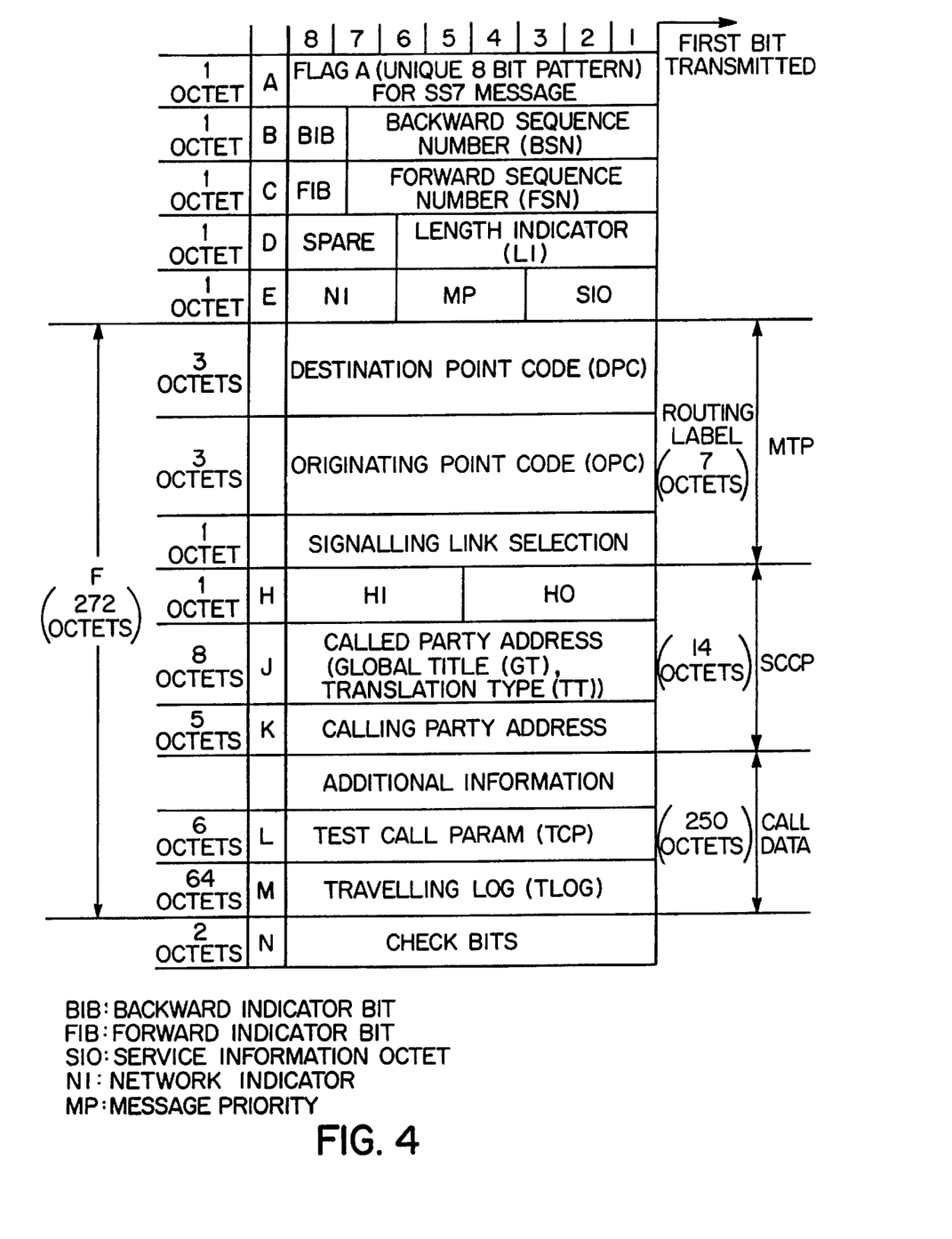
FIG. 4 illustrates an embodiment of a CCS7 network message encoding which includes a test call parameter (TCP) and a travelling log (TLog), in accordance with the present invention.

Referring to FIG. 4, there is illustrated a CCS7 message format which includes the test call parameter (TCP) and the log report, referred to herein below as the travelling log (TLog). Compatibility with conventional formats is achieved by positioning the TCP and the TLog within the call data part of the CCS7 message. Only the TCP and TLog parameters and fields which are relevant to understanding the present invention are described below.

Figure 5:
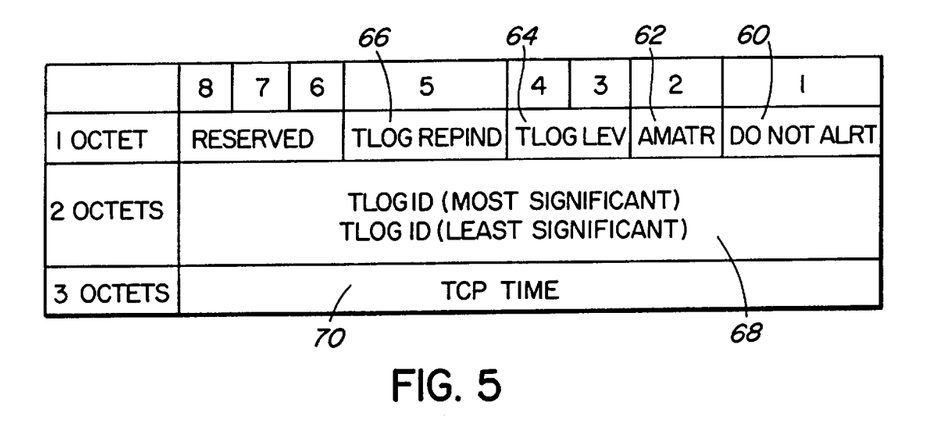
FIG. 5 illustrates various fields within the test call parameter (TCP) for the message in FIG. 4.

Referring to FIG. 5, illustrated is an embodiment for encoding of the test call parameter (TCP) which consists of a number of fields that utilize 6 octets in length. These parameter fields and values are:

DoNotAlrt field 60:
The TCP do not alert (DoNotAlrt) field determines whether or not called party alerting should be performed. The DoNotAlrt field may be encoded as follows:

| Bit | 1 | Description |
|---|---|---|
| | 0 | Alert call |
| | 1 | Do not alert call |

AMATr field 62:
The TCP AMA treatment (AMATr) field defines how network AMA records should be marked for an IN test call. This field identifies in an AMA record that an IN call or portion of an IN call (e.g., IN portion) is part of a test call. This field may be encoded as follows:

| Bit | 2 | Description |
|---|---|---|
| | 0 | Do not mark AMA record as part of test call |
| | 1 | Mark AMA record as part of Test Call |

TLogLev field 64:
The TCP travelling log level (TLogLev) field determines whether or not travelling log (TLog) and/or nodal internal log entries are to be generated. In this field, specifying to generate the traveling log has been integrated with specifying whether to also generate the Bellcore Call History Log (C-Log) as defined in TR-NWT-001284 and GR-1298-CORE. This field may be encoded as follows:

| Bits | 43 | Description |
|---|---|---|
| | 00 | TLog entry not requested and C-Log entry is not requested |
| | 01 | Generate C-Log |
| | 10 | Generate TLog |
| | 11 | Generate both TLog and C-Log |

TLogRepInd field 66:
The TCP travelling log report indicator (TLogRepInd) field specifies how the TLog records are to be reported. This field may be encoded as follows:

| Bit | 5 | Description |
|---|---|---|
| | 0 | Automatically report TLog entries to the Originating point code (OPC) |
| | 1 | Store TLog entries in internal message and report them to the OPC when requested. |

TLogID field 68:
The TCP travelling log ID (TLogID) field identifies the travelling log relevant to a specific IN service test call messages and data. This field shall be a two (2) octet integer that identifies a TLog. The most significant octet is (00000000) when the TLogID is less than 256.

Figure 6:
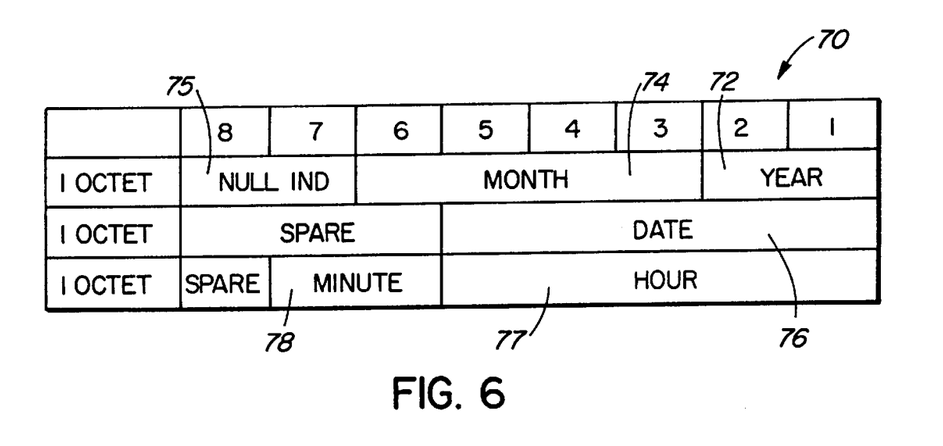
FIG. 6 illustrates in greater detail the time field of the test call parameter (TCP) in FIG. 5.

TCPTime field 70:
The TCP time (TCPTime) field specifies artificial time and date data that SCP/Adjunct service logic should use when processing the IN test call. This field may contain the following fields: TCP Null Indicator, TCP Time Year, TCP Time Month, TCP Time Date, TCP Time Hour, TCP Time Minute. An encoding of the TCPTime field 70 is illustrated in FIG. 6 and described herein below:

The TCPTime year field 72 (bits 2,1 in 1st Octet) may be encoded as follows:

| Bits | 21 | Year |
|---|---|---|
| 00 | 0 (last) | |
| 01 | 1 (current) | |
| 10 | 2 (next) | |
| 11 | Spare | |

The TCPTime month field 74 (bits 6,5,4,3 in 1st Octet) may be encoded as follows:

| Bits | 6543 | Month |
|---|---|---|
| | 0000 | Spare |
| | 0001 | January |
| | 0010 | February |
| | 0011 | March |
| | 0100 | April |
| | 0101 | May |
| | 0110 | June |
| | 0111 | July |
| | 1000 | August |
| | 1001 | September |
| | 1010 | October |
| | 1011 | November |
| | 1100 | December |
| | 1101 | Spare |
| | 1110 | Spare |
| | 1111 | Spare |

The TCPTime null indicator field 75 (bits 8,7 in 1st Octet) may be encoded as follows:

| Bits | 37 | Description |
|---|---|---|
| | 11 | Null |
| | 01 | Not Null |
| | 10 | Reserved |
| | 11 | Reserved |

The TCPTime date field 76 (bits 5,4,3,2,1 in 2nd Octet) may be encoded as follows:

| Bits | 54321 | Date |
|---|---|---|
| | 00000 | Spare |
| | 00001 | 1 |
| | 00010 | 2 |
| | 00011 | 3 |
| | 00100 | 4 |
| | 00101 | 5 |
| | 00110 | 6 |
| | 00111 | 7 |
| | 01000 | 8 |
| | 01001 | 9 |
| | 01010 | 10 |
| | 01011 | 11 |
| | 01100 | 12 |
| | 01101 | 13 |
| | 01110 | 14 |
| | 01111 | 15 |
| | 10000 | 16 |
| | 10001 | 17 |
| | 10010 | 18 |
| | 10011 | 19 |
| | 10100 | 20 |
| | 10101 | 21 |
| | 10110 | 22 |
| | 10111 | 23 |
| | 11000 | 24 |
| | 11001 | 25 |
| | 11010 | 26 |
| | 11011 | 27 |
| | 11100 | 28 |
| | 11101 | 29 |
| | 11110 | 30 |
| | 11111 | 31 |

The TCPTime hour field 77 (bits 5,4,3,2,1 in 3rd Octet) may be encoded as follows:

| Bits | 54321 | Hour |
|---|---|---|
| | 00000 | 0 |
| | 00001 | 1 |
| | 00010 | 2 |
| | 00011 | 3 |
| | 00100 | 4 |
| | 00101 | 5 |
| | 00110 | 6 |
| | 00111 | 7 |
| | 01000 | 8 |
| | 01001 | 9 |
| | 01010 | 10 |
| | 01011 | 11 |
| | 01100 | 12 |
| | 01101 | 13 |
| | 01110 | 14 |
| | 01111 | 15 |
| | 10000 | 16 |
| | 10001 | 17 |
| | 10010 | 18 |
| | 10011 | 19 |
| | 10100 | 20 |
| | 10101 | 21 |
| | 10110 | 22 |
| | 10111 | 23 |
| | 11000 | Spare |
| | 11001 | Spare |
| | 11010 | Spare |
| | 11011 | Spare |
| | 11100 | Spare |
| | 11101 | Spare |
| | 11110 | Spare |
| | 11111 | Spare |

The TCPTime minute field 78 (bits 7,6 in 3rd Octet) identifies the nearest quarter-hour and may be encoded as follows:

| Bits | 76 | Minutes |
|---|---|---|
| | 00 | 0 |
| | 01 | 15 |
| | 10 | 30 |
| | 11 | 45 |

Turning now to FIGS. 7 to 10, the following describes a first embodiment for encoding of the travelling log (TLog) field within the CCS7 network message of FIG. 4. Any network element (i.e., SSP, SCP, STP, IP, MP, Adjunct, etc.) traversed by the test call message adds information in accordance with the encoding, as its stamp, to the TLog. The information advantageously includes the node's point code (PC) and routing data, which will provide a "full network view" of the IN service call. The "full network view" means all element point codes and paths are clearly identified in the TLog.

Figure 7:
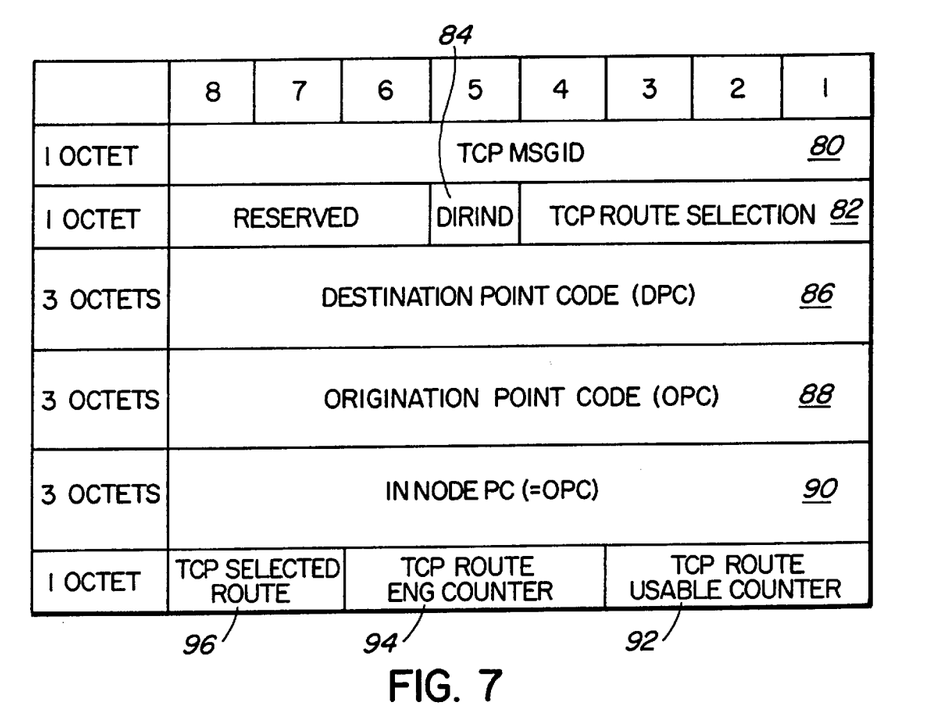
FIG. 7 illustrates a first embodiment, in accordance with the invention, of the travelling log in the CCS7 message of FIG. 4 for an originating IN node.
Figure 8:
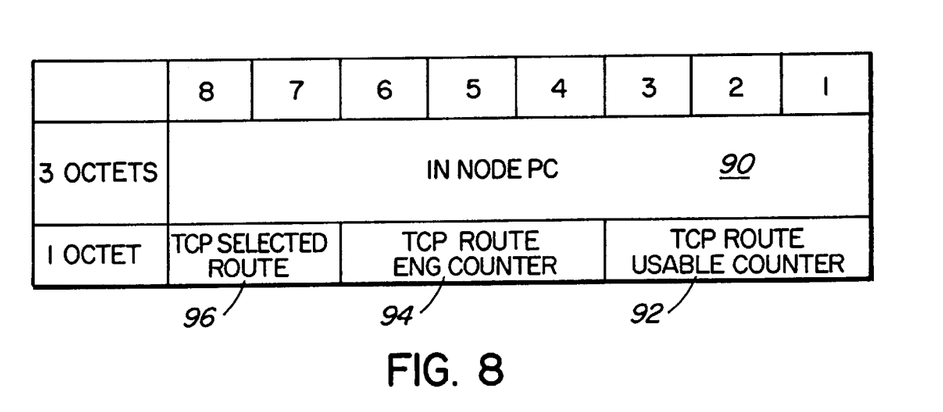
FIG. 8 illustrates a first embodiment of the travelling log for an intermediate IN node.
Figure 9:
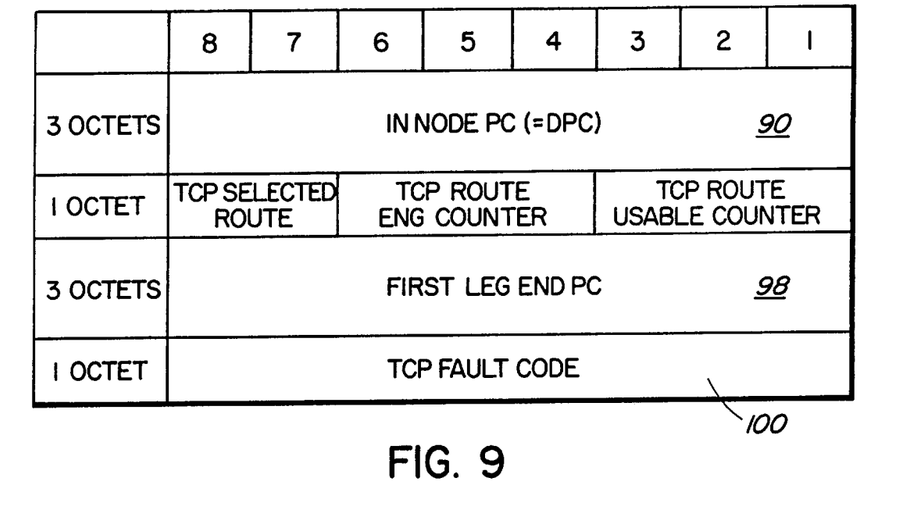
FIG. 9 illustrates a first embodiment of the travelling log for a terminus IN node.

FIG. 7 shows the travelling log encoding format at the originating node, that is the SSP node where the IN test call is launched, for example SSP 12 in FIG. 1. FIG. 8 shows the additional information that an intermediate IN node would add to the travelling log. The length of the information is typically 4 octets (3 octets to identify the IN node PC and one octet of information). At the end of the first leg of the IN test call, the terminus node adds to the travelling log section 8 octets as shown in FIG. 9. The first 4 octets identify the node PC and the function information in terms of route selection and availability/usability. The second 4 octets store a unique PC to mark the end of the first leg for the test call (e.g., an "all one's flag") and a fault code field (e.g., TcpFaultCode is 0 for normal operation).

Figure 10:
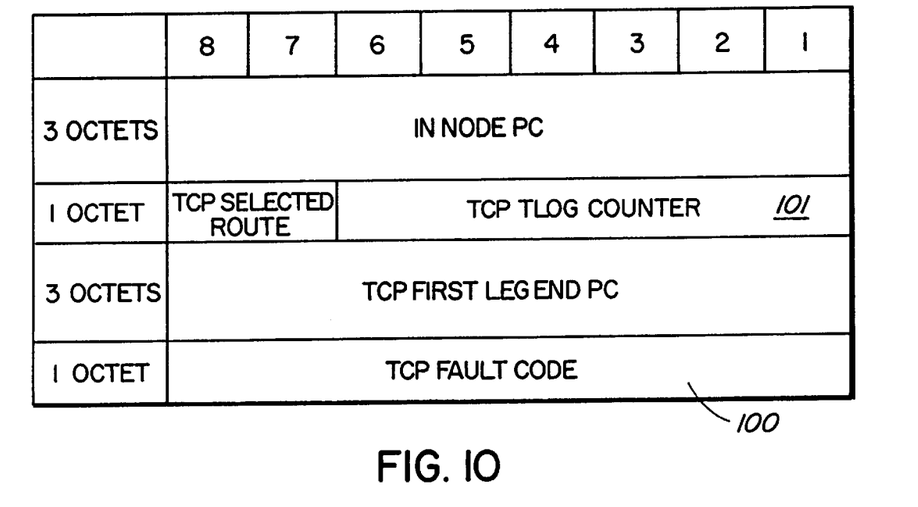
FIG. 10 illustrates the travelling log of FIG. 4 having an encoding format for a terminus node where N>13.

FIG. 10 shows the travelling log encoding format when the number of nodes in the IN test call Travelling Log exceeds 13 nodes. The limit of 13 nodes (or 13 log entries) resulted from the 64 Octets travelling log length imposed in the present embodiment. It is assumed that the travelling log has a fixed 8 octets of overhead (the 1st 8 octets of FIG. 7). The travelling log length for the intermediate nodes and the terminus node is 56 octets. Since each node is allowed 4 octets of log entries, the total number of points is 14 (56/4). However, the terminus node is allowed an additional 4 octets for end flag and fault code log entries. Therefore, the maximum number of the 4 octets log entries is 13. The 13 points (or nodes) of log entries include the log entries from the originating node, the intermediate nodes and the destination or terminus node. If the travelling log length were increased (that is, greater than 64 octets), the number of log entries points (or nodes) would increase accordingly. Alternatively, if the number of log entries points exceeds 13 (N>13) then the travelling log entries fields may be encoded as shown in FIG. 10.

The various fields within the TLog entry formats shown in FIGS. 7 to 10 are defined as follows:

TcpMsgID field 80:
The TCP TLog message identifier (TcpMsgID) field is 8 bits in length and identifies the TLog in relation to the IN test call message.

TcpRouteSelection field 82:
Route selection generally is a function of the route cost (least cost or high cost), route engineered (or provisioned), and route usability per node (or office). The least and high cost selection may be encoded as follows:

| | |
|---|---|
| 00 | No cost criterion |
| 01 | Least cost |
| 10 | High cost |
| 11 | Not valid |

The route availability and usability selection may be encoded as follows:

| | |
|---|---|
| 00 | Choose any route |
| 01 | Choose selected cost if usable, otherwise choose any route |
| 10 | Choose selected cost if usable, otherwise fail |
| 11 | Reserved |

Therefore, the TCP TLog route selection (TcpRouteSelection) field 82 (bits 4,3,2,1 in the 2nd Octet in FIG. 7) may be encoded as follows:

| Bits | 4321 | Description |
|---|---|---|
| | 0000 | Choose any route |
| | 0001 | Error |
| | 0010 | Error |
| | 0011 | Error |
| | 0100 | Error |
| | | Choose least cost if usable, otherwise choose any route |
| | 0110 | Choose high cost if usable, otherwise choose any route |
| | 0111 | Error |
| | 1000 | Error |
| | 1001 | Choose least cost if usable, otherwise fail |
| | 1010 | Choose high cost if usable, otherwise fail |
| | 1011 | Error |
| | 1100 | Spare |
| | 1101 | Spare |
| | 1110 | Spare |
| | 1111 | Spare |

Accordingly, the IN node may choose one of the following routes:
Route 1: Any Route
Route 2: Least cost if available and usable, otherwise choose any route
Route 3: High cost if available and usable, otherwise choose any route
Route 4: Least cost if available and usable, otherwise fail
Route 5: High cost if available and usable, otherwise fail.

If the node route selection was either (1001) or (1010) the IN test call message may fail to reach the Destination Point Code (DPC). For instance, when the specified least/high cost route is not available and usable in the network everywhere along the path being traversed by the IN test call message (i.e., end-to-end, OPC to DPC) then TcpDirInd field 84:
The TLog direction indicator (TcpDirInd) field (bit 5 in the 2nd Octet in FIG. 7) identifies the message direction relative to the originating node. One bit is used to identify direction:

| Bit | 5 | Description |
|---|---|---|
| | 0 | Forward Direction |
| | 1 | Reverse Direction |

Destination Point Code (DPC) 86:
The message point code indicates to which SS7 DPC (Destination Point Code) the message is going. DPC identifies the intended network element/network system (e.g., intended SCP). The DPC field is 3 Octets in length.

Origination Point Code (OPC) field 88:
The message originating point code (OPC) indicates from which SS7 network element the message came. OPC identifies the host name or address. The OPC field is 3 Octets in length.

TcpINNodePC field 90:
The TCP IN node point code (TcpINNodePC) field identifies the IN node. TcpINNodePC field is 3 Octets in length. Permissible values are:
For SSPs, the SS7 Point Code (PC)
For SCPs, the SS7 Point Code (PC)
For IPs, the IP ID (i.e., DN, Nature of number, Numbering Plan).
For MPs, point codes are the permissible values for SSPs and/or SCPs as defined in the IN environment.

TcpRouteUsableCounter field 92:
The TCP route usable counter (TcpRouteUsableCounter) field 92 contains the number of usable routes in the network for the IN test call. The counter is 3 bits and its value ranges from 0 (zero) to 7 route usable.

TcpRouteEngCounter field 94:
The TCP route engineered counter (TcpRouteEngCounter) field contains the number of engineered (or provisioned) routes in the network. The counter is 3 bits and its value ranges from 0 (zero) to 7 routes engineered (or provisioned) at the node or office.

TcpSelectedRoute field 96:
The TCP selected route cost (TcpSelectedRoute) field contains the cost of the route selected for the IN test call message.

TcpFirstLegEndPC field 98:
The TCP first leg end point code (TcpFirstLegEndPC) field indicates the node point code at the end of the IN test call message path. The TcpFirstLegEndPC field is 3 Octets in length and has a unique value, such as an all one's point code (PC), that is "FF FF FF" (Hex).

TcpFaultCode field 100:
The TCP fault code (TcpFaultCode) field specifies a value indicative of a particular fault condition. The TcpFaultCode may be an integer value within the range (0 . . . 255). The following are examples of fault code values and the related faults:

| Value | Description |
| --- | --- |
| 0 | Normal |
| 1 | Wrong Data field |
| 2 | Time-out |
| 3 | Resource canceled |
| 4 | Link Failure |
| 5 | Resource Failure |
| 6 | Incorrect Trigger Assignment |
| 7 | Incorrect Resource Assignment |
| 8 | Route Failure |
| 9 | Channels busy |
| 10 | Incorrect service logic |
| 11 | Resource not available |
| 12 | Subscription data is not valid |
| 13 | Subscriber data is not valid |
| 14 | Routing data is not valid |
| 15 | Overload control encountered |
| 16 | Blocking encountered |
| 17 | Undefined process encountered |
| 18 | Abort |
| 19 | Undefined agent encountered |
| 20 | Looping |
| 21–255 | Spares |

TcpTLogCounter field 101:
The TCP TLog counter (TcpTLogCounter) field contains the number of nodes in the network that the IN test call has traveled to without recording any information. This counter forms part of the format given in FIG. 10 and is incremented when the TLog length is exhausted (e.g., exceeds 13 entries). The TcpTLogCounter is 6 bits in length and its value ranges from (0 . . . 63).

Figure 11:
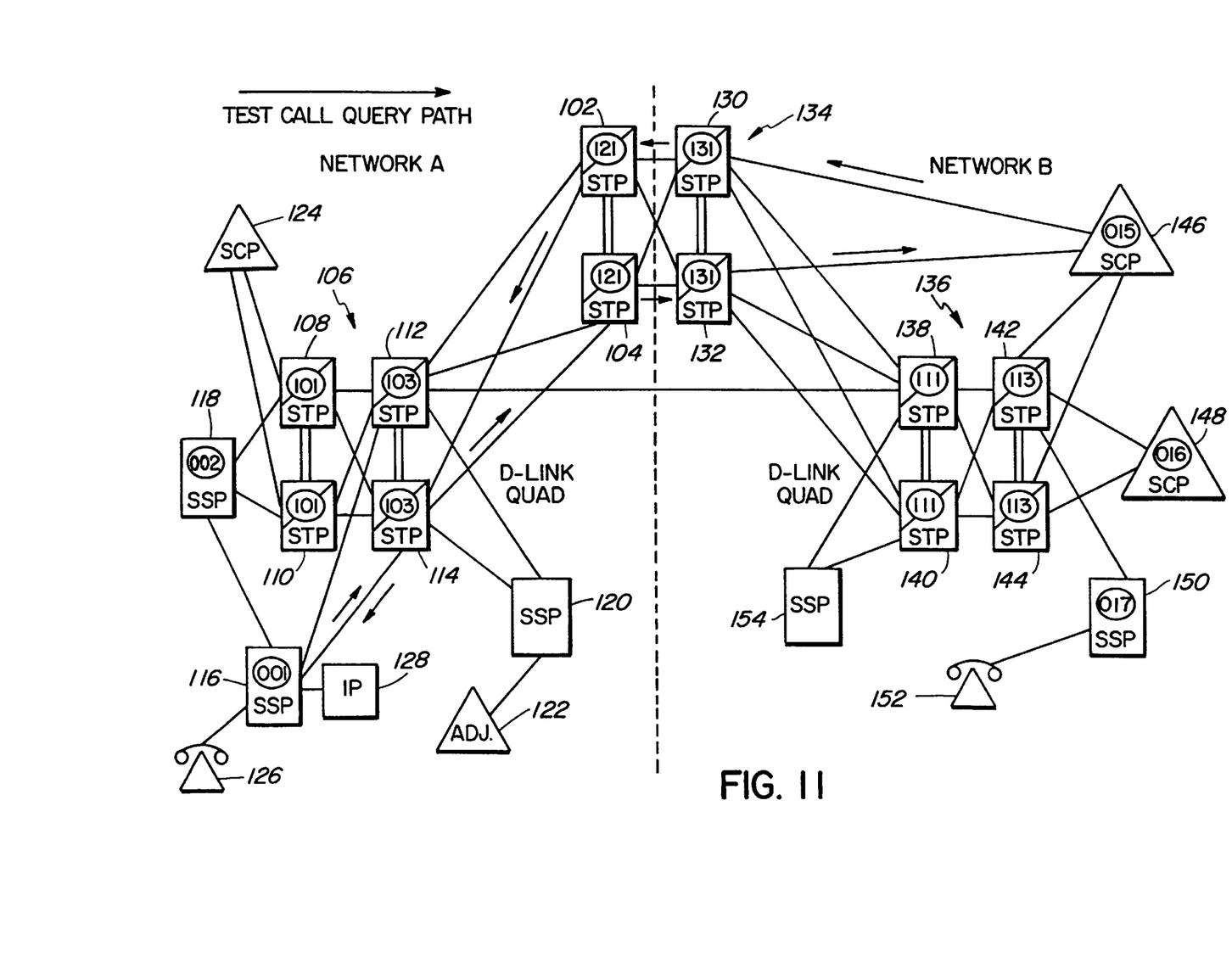
FIG. 11 illustrates a representative network configuration including two intelligent networks to be tested in accordance with an embodiment of the present invention.
Figure 12:
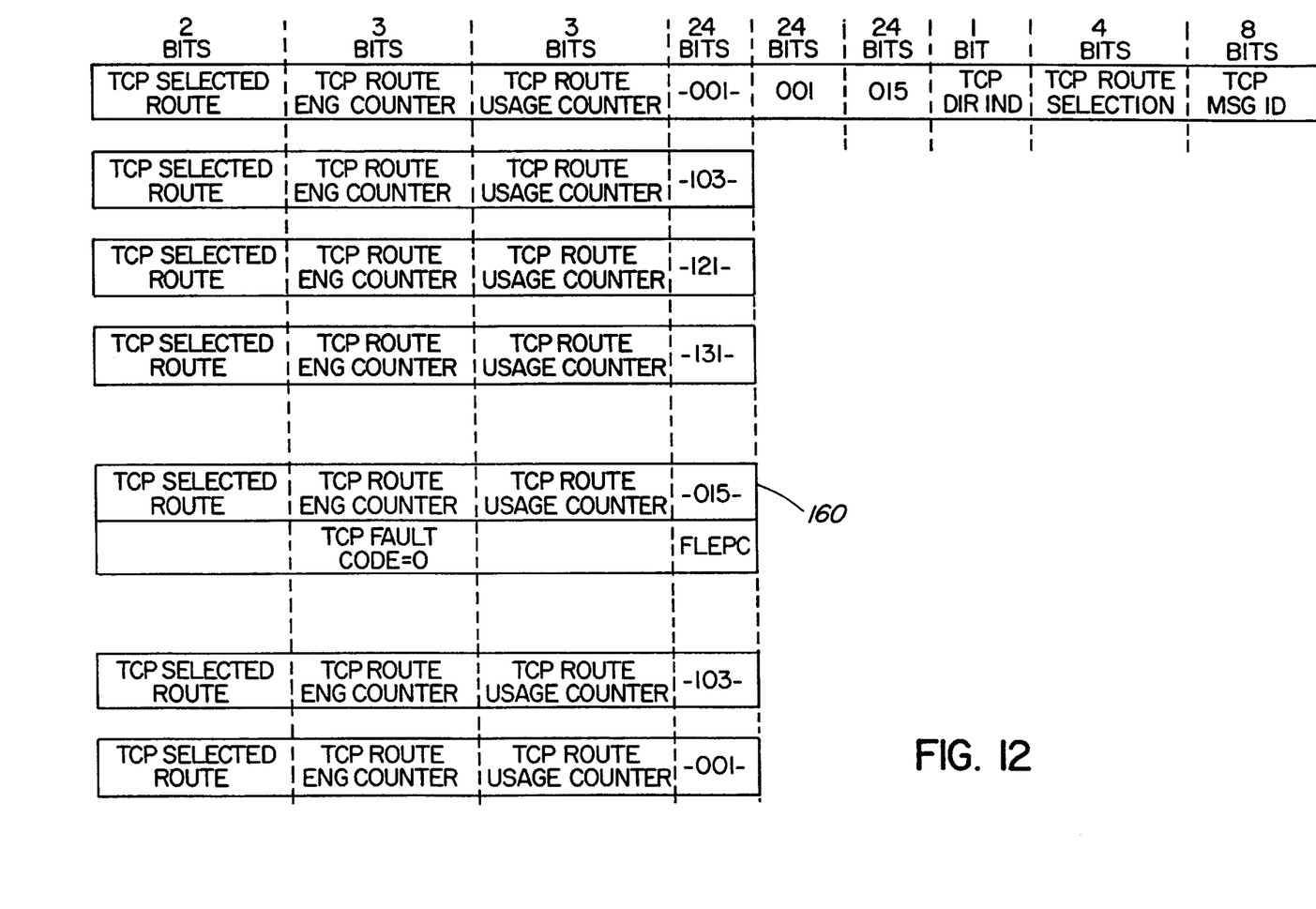
FIG. 12 illustrates the IN test call message as it passes through the forward and return paths through the intelligent network.

A more detailed description of the operation of the SSP IN test call is provided in conjunction with FIGS. 11 and 12.

Referring to FIG. 11, there is illustrated a representative network configuration. The network configuration includes two intelligent networks labeled as Network A and Network B. The nodes of networks A and B are labeled in accordance with IN point code (PC) convention. The network A includes primary layer STP pairs 102 and 104 (having PC component 121), secondary level STP pairs B-link quad 106 including STP pairs 108 and 110 (having PC component 101) and STP pairs 112 and 114 (having PC component 103). The network A also includes an originating switch, SSP 116, (having PC component 1, PC=245-103-001) and a second switch, SSP 118 (having a PC component 2, PC=245-101-002). Other IN components in the network A include an SSP 120, an adjunct 122, an SSP 124, a calling party 126 is shown connected to the originating switch 116 as is an intelligent peripheral (IP) 128.

The network B includes primary layer STP pairs 130 and 132 (having a PC component 131) that together with STP pairs 102 and 104 of network A form a B-link quad 134 and a secondary level STP pairs B-link quad 136 includes STP pairs 138 and 140 (having PC component 111, PC=252-111-150) and STP pairs 142 and 144 (having PC component 113, PC=-252-113-150). The network B also includes a serving SCP 146 (having PC component 015, PC=252-113-015), a second SCP 148 (having PC component 016, PC=252-113-016) and a terminating switch, SSP 150 (having PC component 017, PC=252-113-017). The SSP 150 has a called party 152 connected to it. The network B also includes a second SSP 154 connected to the STP pairs 138 and 140.

With regard to the IN test call in accordance with the present embodiment fields of most interest are those containing information on the message route selection (TcpRouteSelection), message direction (TcpDirInd) and travelling log (TLog) entries section. Other fields are relevant to the CCS7 network protocol (MTP, SCCP, and TCAP) generally.

The travelling log (TLog) entries section is used to keep track of how the message propagated through the network. Based on the route selection and message direction (TcpRouteSelection and TcpDirInd), the IN test call query message will travel through the network from originating node SSP 116 to destination node SCP 146. Ultimately, the message should find its way through to the DPC that it was attempting to reach. However, it may not due to various error conditions in the network. As described herein above, the TLog section consists of a number of log entries with each entry consisting of the node point code (PC) and the node data.

The PC is that of the node making the log entry in the TLog section. The node data is an information field describing the condition at the node based on the requirements of the route selected by the node, the number of routes engineered (or provisioned) at the node and the number of routes usable for the IN query message at the node.

Numerous scenarios are possible for the message traversing the network. Examples of some scenarios are described herein below. Four scenarios are used to further describe basic operation along a route. For the sake of presentation in the points below, the DPC designation is interchangeable with OPC based on the message direction indicator (TcpDirInd). The process is basically the same except at the end points, that it, at the DPC, the message is turned around and at the OPC, the message is analyzed. The four scenarios that will be described are: successful IN test call propagation; successful IN test call delivery; unsuccessful IN test call delivery; and unsuccessful routing.

Successful Test Call Propagation

The node (i.e., intermediate node) receiving the test call query is not the final DPC but is successfully able to route the IN test call query to next node.

At any intermediate IN node in the network, for example STP 102, that node appends a log entry to the TLog section that includes its PC and also includes the node data or results in the log entry. In the result, TcpSelectedRoute specifies the route selected by the node. TcpRouteEngCounter provides the number of routes engineered or provisioned at the node, and TcpRouteUsableCounter provides the routes available and usable for routing the query to the next node in the query message path.

For example, if the node has selected Route__2/Route__3 (defined above in connection with Route selection field 82 encoding), the result contains an indication of which cost was chosen and the number of routes usable for routing the query to the next node in the query message path. If there is only one route, then no cost is identified and the number of routes available is set to 1 and routes usable is set to 1. If no cost can be identified (i.e., in case of STPs load sharing) then no cost is set and routes engineered and usable are set accordingly.

Alternatively, if the node has selected Route__4/Route__5 and if the specified cost is available, then the result contains a cost indication and the routes engineered and usable. If there is only one route and it is available/usable, then the cost is indicated and only 1 route is available/usable. If the specified cost is not usable, then this is an error condition relating to unsuccessful routing as described herein below.

Successful Test Call Delivery

The node receiving the test call query is the final DPC and is successful in handling the request.

The following activities are performed at the destination node with the destination point code (DPC), that is, SCP 146 in FIG. 11. FIG. 12 illustrates a portion of the query as it traverses nodes in the network. In operation, the destination node:

1. Appends a log entry 160 to the TLog section that has the PC of the DPC (015);
2. Clears the result because this is the "end of journey";
3. Includes in the log entry, a special result indication;
4. Marks the TcpFirstLegEndPC field. This is a special log entry and it consists of an "all one's PC-FF FF FF code along with a normal operation fault code (i.e., TcpFaultCode=0);
5. Sets TcpDirInd to indicate that the message is heading in the reverse direction (e.g., TcpDirInd=1); and
6. Sends the query response message back towards the originating node with the originating point code (OPC).

The first leg end (FLE) indicator is used to formally mark the TLog section. This helps the system handle unexpected conditions in a logical fashion. It also provides a place to associate a TcpFaultCode in the TLog while keeping each log entry a fixed length. Unexpected events can occur along a message route at any time and for a number of reasons. The purpose of the system is to handle these conditions logically so that the problem can be sectionalized and looked at more closely with other tools or methodology.

The indicator in the TLog for direction (TcpDirInd) is used to indicate which way the message is currently propagating through the network. With reference to the originator of the IN test call query message, TcpDirInd is not set in the OPC to DPC direction. If it makes it to the DPC or there is a failure along the route, then the TcpDirInd is set.

Unsuccessful Test Call Delivery

The node is the final DPC for the IN test call query message and is unsuccessful in handling the request. The following activities are performed by the node with the destination point code (DPC):

1. Appends a log entry to the TLog section that has the PC of the DPC;
2. Clears the results because this is the "end of journey";
3. Includes in the log entry, a special result indication;
4. Marks the TcpFirstLegEndPC field with the special log entry consists of the "all one's PC-FF FF FF" coding, together with the TcpFaultCode; and
5. Sets TcpDirInd to indicate that the message is heading in the reverse direction (i.e., TcpDirInd=1).

Unsuccessful Routing

Unsuccessful routing can occur at various stages of the query message path. The node, unable to route the query message, must undertake the actions to identify the relevant problem to the far end. The conditions such as route set unusable, maintenance, processor outage, may be the cause of unsuccessful journey. The following activities are performed by the node:

1. Appends a log entry to the TLog section with its point code (PC);
2. Includes with the log entry a result with the following indications set:
   a. If the failure was caused by not being able to route due to the actions indicated in the route selection, then cost indication in (TcpSelectedRoute) should be that of the route selected (i.e. least cost "01" or high cost "10") and the number of routes engineered in the (TcpRouteEngCounter) should be equal to the number of routes usable, while the routes usable counter (TcpRouteUsableCounter), should indicate the number of usable routes not meeting the cost selection.
   b. If the failure was caused by other conditions, then no cost indication should be set and the routes provisioned should be set accordingly, while routes usable should be set to zero.
   c. Marks the First Leg End. As before, this is a special log entry and it consists of a PC (i.e., "all one's PC-FF FF FF) along with the error code (TcpFaultCode). The TcpFaultCode indicates that the node was unable to meet the node route selection requirements; and
3. Sets TcpDirInd to indicate that the message is heading in the reverse direction (TcpDirInd=1). Return of the Travelling Log (TLog) message to the originating switch, SSP 116 of FIG. 11, indicates test completion. The return of the TLog message is analyzed to see if it transversed the network without problems:
   1. If there is no FLE with an TcpFaultCode (i.e. not "all ones", then the test was a success. However, the TLog is then analyzed to see if the route traverse was as expected and that there were not any unusual characteristics, such as:
a. Unexpected PCs.
b. Too many nodes in route.
c. Only 1 available route.
d. Only 1 usable route.

If unusual characteristics are found, the user could execute a different function information arrangement (e.g., choose a different cost to force a different path);

2. If there is an FLE with a TcpFaultCode (i.e. not zero) (TcpFaultCode≠0), then the test has discovered a potential problem. The TcpFaultCode has to be analyzed along with the return route data to sectionalize the fault to a given node and problem; and 3. Route information from the TLog can be reviewed to determine additional testing.

Figure 13:
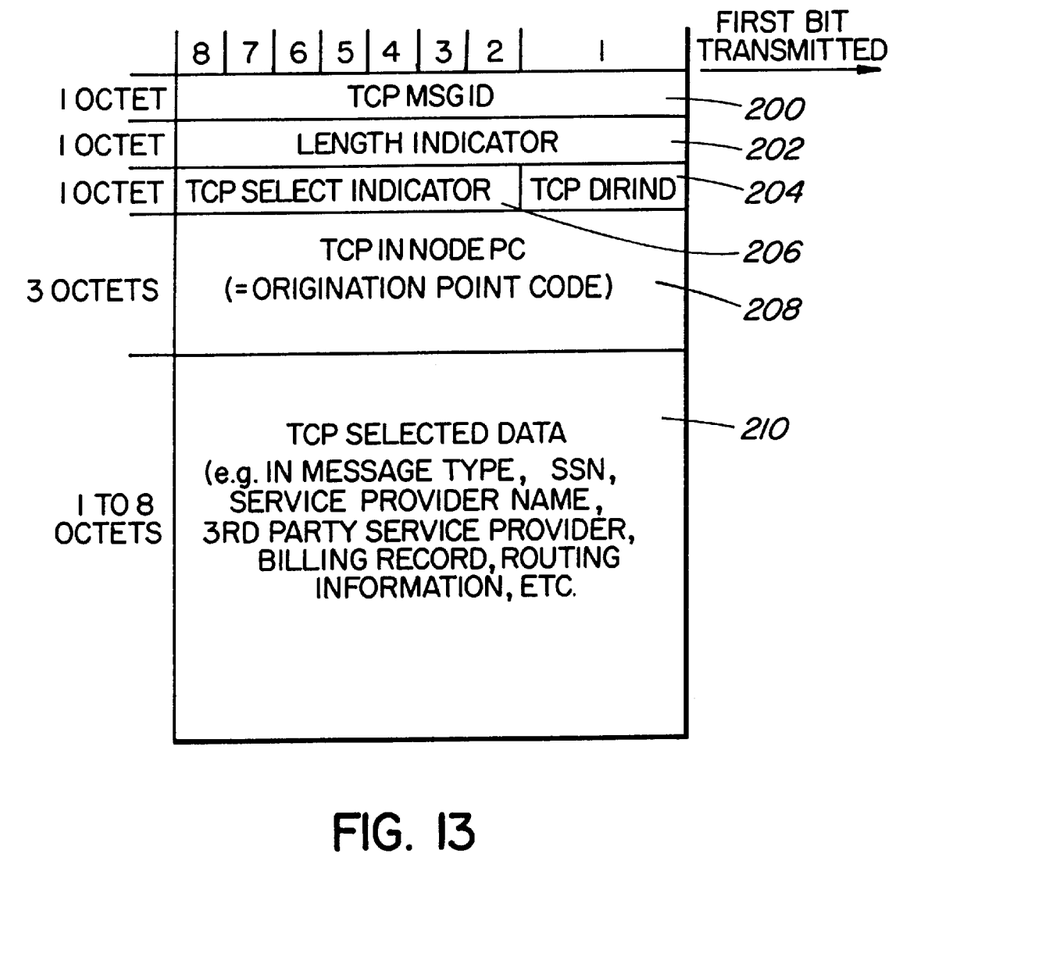
FIG. 13 illustrates a second embodiment, in accordance with the invention, of the travelling log in the CCS7 message of FIG. 4 for an originating IN node.
Figure 14:
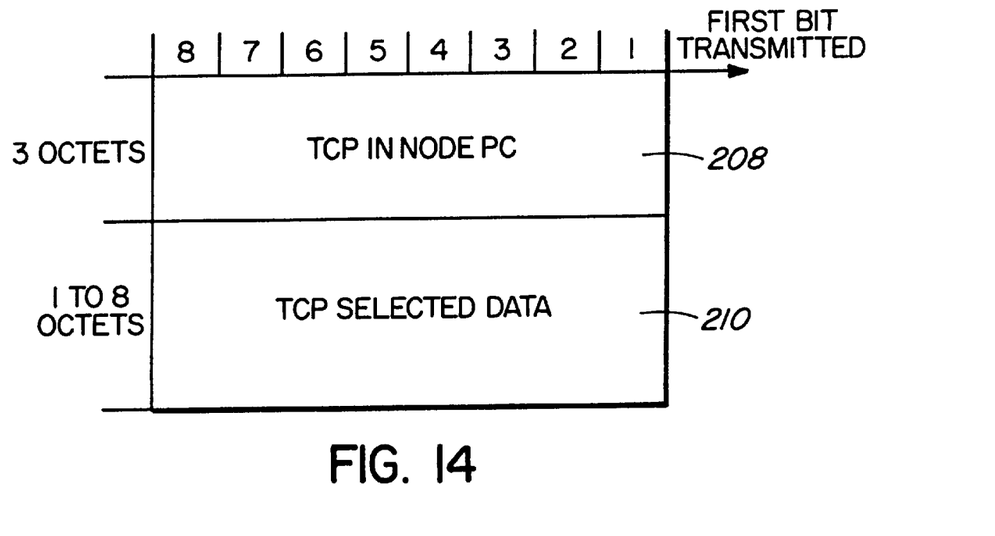
FIG. 14 illustrates a second embodiment of the travelling log for an intermediate IN node.
Figure 15:
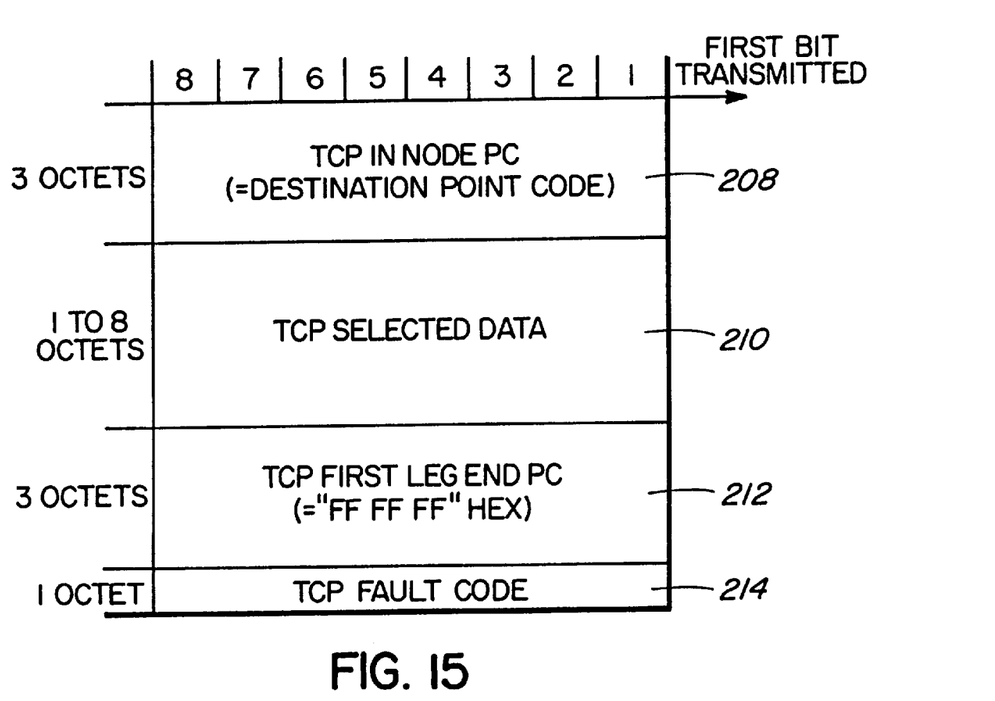
FIG. 15 illustrates a second embodiment of the travelling log for a terminus IN node.

Now referring to FIGS. 13 to 15 concurrently, illustrated is a second embodiment for encoding the traveling log (TLog). FIG. 13 shows the TLog format for an entry at the node originating the test call message. FIG. 14 depicts an entry to the TLog at an intermediate node within the route traversed by the test call message, and FIG. 15 illustrates the TLog encoding for an entry made at the terminus node. The definitions of the fields within the formats depicted in FIGS. 13 to 15 are as follows:

TcpMsgID field 200:
 The TLog TCP message identifier (TcpMsgID) field is 8 bits in length and identifies the TLog in relation to the IN test call message.

Length indicator field 202:
 The length of the TLog is variable and a function of the amount of data stored in data field 210 which may range between one and eight bytes in size. The length indicator field 202 indicates the number of octets contained in the TLog and may be updated at each node as a new entry is appended to the TLog.

TcpDirInd field 204:
 The TLog TCP direction indicator (TcpDirInd) field (bit 1 in the 3rd Octet in FIG. 13) identifies the message direction relative to the originating node. One bit is used to identify direction:

| Bit | 1 | Description |
|---|---|---|
| | 0 | Forward Direction |
| | 1 | Reverse Direction |

TcpSelectIndicator field 206:
 The TLog TCP selection indicator (TcpSelectIndicator) field stores a value identifying which data is to be collected for the test call. The following is an example of selector indicator values with corresponding data that is to be included in the TLog by each node traversed during routing of the test call message:

| Value | Description |
|---|---|
| 0 | Service Provider (SP) name |
| 1 | Service Provider (SP) Address |
| 2 | SP name and Address |

-continued

| Value | Description |
|---|---|
| 3 | 3rd Party SP (or re-seller) name |
| 4 | 3rd Party SP (or re-seller) address |
| 5 | 3SP name and address |
| 6 | Routing cost information |
| 7 | Routing messages |
| 8 | Routing cost information and messages |
| 9 | SP and 3SP name, address and routing cost information and messages |
| 10 | Service SubSystem number (SSN) |
| 11 | SP name and address and SSN |
| 12 | Billing records |
| 13 | SP and 3SP name and address and billing records |
| 14 | SP and 3SP name and address, SSN and billing records |
| 15 | IN message type |
| 16 | SSN and IN message type. |
| 17 | Local Exchange Carrier (LEC) name |
| 18 | LEC address |
| 19 | Inter Exchange Carrier (IXC) name |
| 20 | IXC address |
| 21–255 | Spares |

TcpINNodePC field 208:
 The TCP IN node point code (TcpINNodePC) field identifies the IN node. This field identifies the IN node that is supplying the TLog entry. TcpIN-NodePC field is 3 Octets in length. This field is similar to field 90 described above in connection with FIGS. 7 and 10.

In FIG. 13, the TcpINNodePC field 208 contains the test call message originating point code (OPC) indicating from which SS7 network element the message came. OPC identifies either the host name or address. In FIG. 14, the TcpINNodePC field 208 contains the point code associated with an intermediate node to which the test call message has been routed. In FIG. 15, the TcpINNodePC field 208 contains the point code of the node at which the first leg of the test call is terminated. Under normal conditions, the value of the TcpINNodePC is the test call destination point code (DPC), to which the message (e.g., IN query message) was intended to be routed.

TcpSelectedData field 210:
 The TCP selected data (TcpSelectedData) field is the area within the TLog entry where the data specified by the value of the selector indicator 206 is stored. In the particular embodiment of the TLog being described, the size of this field length may range between one and eight octets.

TcpFirstLegEndPC field 212:
 The TCP first leg end point code (TcpFirstLegEndPC) field 212 indicates the node point code at the end of the IN test call message path. The TcpFirstLeg-EndPC field is 3 Octets in length and has a unique value, such as an all one's point code (i.e., "FF FF FF" Hex). This field is similar to field 98 described above in connection with FIGS. 9 and 10.

TcpFaultCode field 214:
 The TCP fault code (TcpFaultCode) field specifies a value indicative of a fault encountered. This field is similar to field 100 described above in connection with FIGS. 9 and 10.

It is noted that the second embodiment of the TLog incorporates data relating to the application layer of the IN elements, whereas the first embodiment of the TLog relates more to lower layers (e.g., the network layer) of the CCS7 protocol. Consequently, the second embodiment may be more readily integrated with existing IN technology.

Those skilled in the art will recognize that various modifications and changes could be made to the invention without departing from the spirit and scope thereof. It should therefore be understood that the claims are not to be considered as being limited to the precise embodiments of the test call methodology and message formats set forth above, in the absence of specific limitations directed to each embodiment.

What is claimed is:

1. In a telecommunications network that includes an intelligent network, the intelligent network having at least a service switching point and a service control point, a method of collecting data comprising the steps of:
   sending, by the service switching point, a test call message to a destination node, the test call message including an indication that it is a test call message, an indication for identifying which data is to be collected and a log for receiving collected data;
   applying, by a node that the test call message traverses en route to the destination node and responsive to the indication for identifying which data is to be collected, an entry to the log; and
   sending a return message, which includes the log, to the originating node from a terminus node.

2. A method as claimed in claim 1, wherein the return message includes the indication for identifying which data is to be collected, and the method further comprises applying, by a node that the return message traverses en route to the originating node and responsive to the indication for identifying which data is to be collected, an entry to the log.

3. A method as claimed in claim 2, wherein the step of sending the return message includes applying, by the terminus node, an indication of a fault to the log.

4. A method as claimed in claim 2, wherein each entry includes an identification of the node.

5. A method as claimed in claim 4, wherein the indication for identifying which data is to be collected is a value requesting a service provider name.

6. A method as claimed in claim 4, wherein the indication for identifying which data is to be collected is a value requesting a service provider address.

7. A method as claimed in claim 4, wherein the indication for identifying which data is to be collected is a value requesting a service provider name and address.

8. A method as claimed in claim 4, wherein the indication for identifying which data is to be collected is a value requesting a third party service provider name.

9. A method as claimed in claim 4, wherein the indication for identifying which data is to be collected is a value requesting a third party service provider address.

10. A method as claimed in claim 4, wherein the indication for identifying which data is to be collected is a value requesting a third party service provider name and address.

11. A method as claimed in claim 4, wherein the indication for identifying which data is to be collected is a value requesting routing cost information.

12. A method as claimed in claim 4, wherein the indication for identifying which data is to be collected is a value requesting routing messages.

13. A method as claimed in claim 4, wherein the indication for identifying which data is to be collected is a value requesting routing cost and messages.

14. A method as claimed in claim 4, wherein the indication for identifying which data is to be collected is a value requesting service provider name and address, third party service provider name and address, and routing cost information and messages.

15. A method as claimed in claim 4, wherein the indication for identifying which data is to be collected is a value requesting service subsystem number.

16. A method as claimed in claim 4, wherein the indication for identifying which data is to be collected is a value requesting service provider name and address, and service subsystem number.

17. A method as claimed in claim 4, wherein the indication for identifying which data is to be collected is a value requesting billing records.

18. A method as claimed in claim 4, wherein the indication for identifying which data is to be collected is a value requesting service provider name and address, third party service provider name and address, and billing records.

19. A method as claimed in claim 4, wherein the indication for identifying which data is to be collected is a value requesting service provider name and address, third party service provider name and address, service subsystem number, and billing records.

20. A method as claimed in claim 4, wherein the indication for identifying which data is to be collected is a value requesting intelligent network message type.

21. A method as claimed in claim 4, wherein the indication for identifying which data is to be collected is a value requesting service subsystem number and intelligent network message type.

22. A method as claimed in claim 4, wherein the indication for identifying which data is to be collected is a value requesting local exchange carrier name.

23. A method as claimed in claim 4, wherein the indication for identifying which data is to be collected is a value requesting local exchange carrier address.

24. A method as claimed in claim 4, wherein the indication for identifying which data is to be collected is a value requesting inter exchange carrier name.

25. A method as claimed in claim 4, wherein the indication for identifying which data is to be collected is a value requesting inter exchange carrier address.

26. A method as claimed in claim 4, wherein the test call message and the return message are a common channel signaling system number 7 (CCS7) message which includes a parameter indicative of that message being a test message.

27. A method as claimed in claim 26, wherein the CCS7 message is an ISDN user part message.

28. A method as claimed in claim 26, wherein the CCS7 message is an intelligent network query message.

29. A method as claimed in claim 4, wherein the step of sending the return message includes applying, by the terminus node, an indication of a fault to the log.

30. A method as claimed in claim 29, wherein the terminus node is the destination node.

31. A method as claimed in claim 29, wherein the terminus node is any node from which the test message can not be further routed towards the destination node.

32. A method as claimed in claim 1, wherein the entry includes a number corresponding to a count of routes that are usable for the test call message.

33. A method as claimed in claim 32, wherein the entry includes a number corresponding to a count of routes that are provisioned at the node.

34. A method as claimed in claim 33, wherein the entry includes a cost figure for a selected route for the test call message.

35. A method for collecting data at a node in a telecommunications network that includes an intelligent network, comprising the steps of:

receiving at the node a test call message including routing information identifying a destination node, said test call message including an indication for identifying which data is to be collected and, a log for receiving collected data;

applying at the node an entry to the log responsive to the indication for identifying which data is to be collected; and if the routing information identifies the node as said destination node, replying to the originating node with the log.

36. A method for collecting data at a node in a telecommunications network that includes an intelligent network, comprising the steps of:

receiving at the node a test call message including routing information identifying a destination node, said test call message including an indication for identifying which data is to be collected, and a log for receiving collected data;

applying at the node an entry to the log responsive to the indication for identifying which data is to be collected; and if the routing information identifies another node as the destination node, forwarding the log according to the routing information.

37. A method for collecting data at a node in a telecommunications network that includes an intelligent network, comprising the steps of:

receiving at the node a test call message including routing information identifying a destination node, said test call message including an indication for identifying which data is to be collected, and a log for receiving collected data;

applying at the node an entry to the log responsive to the indication for identifying which data is to be collected; and if the routing information identifies another node as the destination node and the test call message cannot be routed further, entering an error message in said the log and replying to the originating node with the log.

38. A method for collecting data at a node in a telecommunications network that includes an intelligent network, comprising the steps of:

sending by the node a test call message identifying a destination node, the test call message including an indication for identifying which data is to be collected, and a log for receiving collected data;

receiving a return message to the test call message which includes said log, said log including entries made in response to the indication for identifying which data is to be collected by a node in the network.

39. A node in a telecommunications network that includes an intelligent network, comprising:

means for receiving at the node a test call message including routing information identifying a destination node, said test call message including an indication for identifying which data is to be collected, and a log for receiving collected data;

means for applying at the node an entry to the log responsive to the indication for identifying which data is to be collected; and means for determining if the routing information identifies the node as the destination node; and means for replying to the originating node with the log.

40. A node in a telecommunications network that includes an intelligent network, comprising:

means for receiving a test call message including routing information identifying a destination node, said test call message including an indication for identifying which data is to be collected, and a log for receiving collected data;

means for applying at the node an entry to the log responsive to the indication for identifying which data is to be collected; and means for determining if the routing information identifies another node as the destination node; and means for forwarding the log according to the routing information.

41. A node in a telecommunications network that includes an intelligent network, comprising:

means for receiving at the node a test call message including routing information identifying a destination node said test call message including an indication for identifying which data is to be collected, and a log for receiving collected data;

means for applying at the node an entry to the log responsive to the indication for identifying which data is to be collected; and means for determining if the routing information identifies another node as the destination node and if the test call message can be routed; and means for replying to the originating node with the log.

42. A node in a telecommunications network that includes an intelligent network, comprising:

means for sending a test call message identifying a destination node, the test call message including an indication for identifying which data is to be collected, and a log for receiving collected data;

means for receiving a return message to the test call message which includes said log, said log including entries made in response to the indication for identifying which data is to be collected; and means for reading the entries in the log.

* * * * *